US012603843B2

(12) United States Patent
Dontula Sriram Ulu et al.

(10) Patent No.: US 12,603,843 B2
(45) Date of Patent: Apr. 14, 2026

(54) APPARATUSES AND METHODS FOR MANAGING TRAFFIC IN COMMUNICATION NETWORKS AND SYSTEMS IN CONJUNCTION WITH A CONFIGURABLE BROKER

(71) Applicant: AT&T Intellectual Property I, L.P., Atlanta, GA (US)

(72) Inventors: Srinath Dontula Sriram Ulu, Sugar Hill, GA (US); John Yannacci, Monroe Township, NJ (US); Saud Asif, East Brunswick, NJ (US); Mohammad Islam, Merrimack, NH (US); Sunil Maloo, Edison, NJ (US); Vijay Bhaskar Uppala, Bothell, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 37 days.

(21) Appl. No.: 18/456,543

(22) Filed: Aug. 28, 2023

(65) Prior Publication Data

US 2024/0259314 A1 Aug. 1, 2024

Related U.S. Application Data

(60) Provisional application No. 63/482,411, filed on Jan. 31, 2023.

(51) Int. Cl.
 *H04L 47/12* (2022.01)
 *H04L 43/12* (2022.01)

(52) U.S. Cl.
 CPC .............. *H04L 47/12* (2013.01); *H04L 43/12* (2013.01)

(58) Field of Classification Search
 None
 See application file for complete search history.

(56) References Cited

U.S. PATENT DOCUMENTS

| | | | | | |
|---|---|---|---|---|---|
| 9,407,509 | B2 * | 8/2016 | Porras | ................. | H04L 63/1458 |
| 11,153,177 | B1 * | 10/2021 | Hermoni | ............. | H04L 41/0859 |
| 2017/0324632 | A1 * | 11/2017 | Arora | ....................... | H04L 43/04 |
| 2019/0075056 | A1 * | 3/2019 | Lu | ........................ | H04L 63/1425 |
| 2020/0014712 | A1 * | 1/2020 | Gusat | ..................... | H04L 45/08 |
| 2023/0308931 | A1 * | 9/2023 | Ueta | ................. | H04W 28/0221 |

* cited by examiner

*Primary Examiner* — Fadi Haj Said

(74) *Attorney, Agent, or Firm* — Guntin & Gust, PLC; Erik Boyd

(57) ABSTRACT

Aspects of the subject disclosure may include, for example, obtaining a configuration of a network, selecting a first configuration of a network packet broker based on the configuration of the network, providing first network traffic to the network packet broker for processing in accordance with the first configuration of the network packet broker, obtaining, based on the providing of the first network traffic to the network packet broker, first processed network traffic, and analyzing the first processed network traffic to determine whether a first modification in the network is warranted. Other embodiments are disclosed.

20 Claims, 9 Drawing Sheets

Figure 2B:
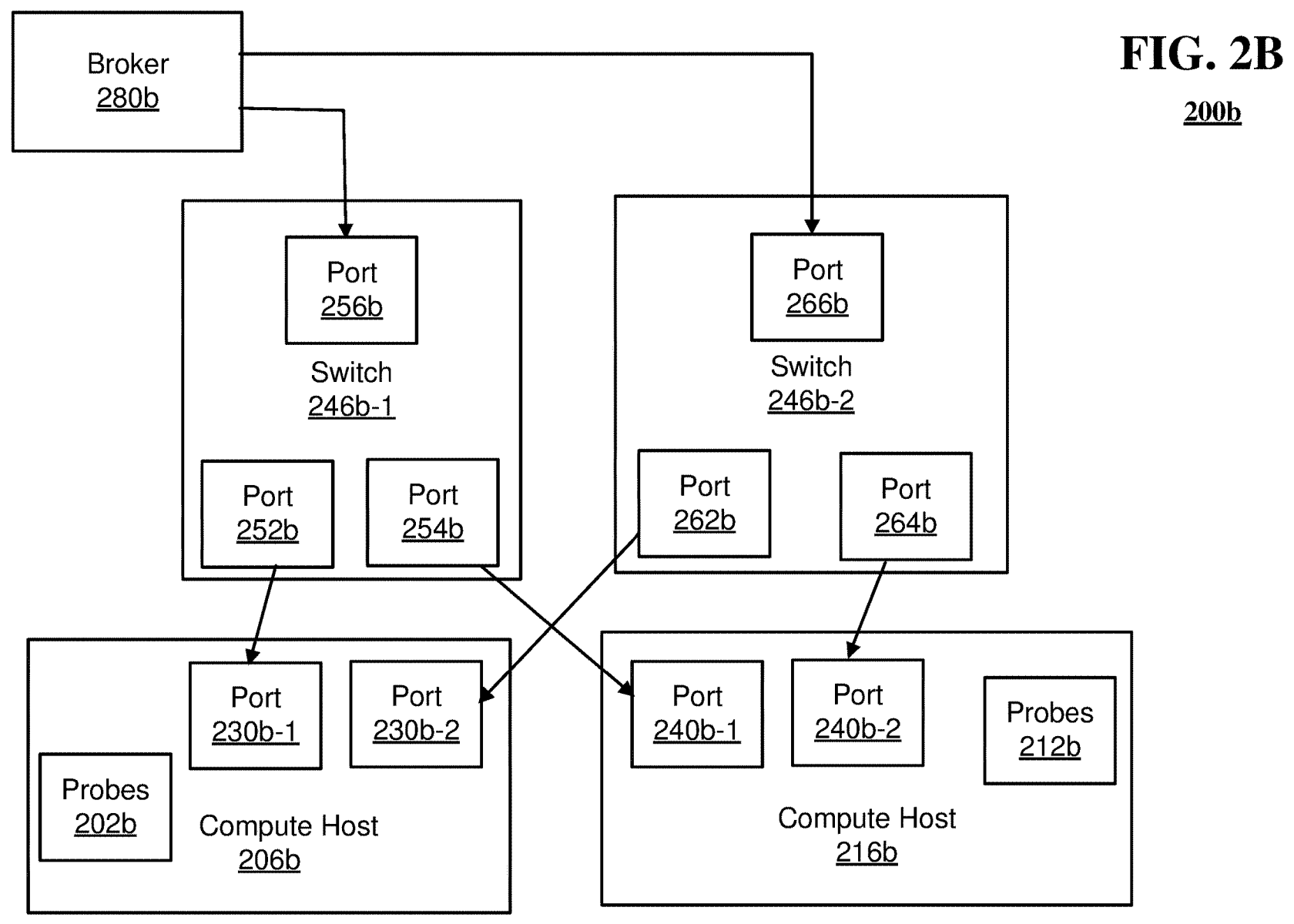

Broker 280b

Switch 246b-1
- Port 256b
- Port 254b
- Port 252b

Switch 246b-2
- Port 266b
- Port 264b
- Port 262b

Compute Host 206b
- Port 230b-2
- Port 230b-1
- Probes 202b

Compute Host 216b
- Port 240b-2
- Port 240b-1
- Probes 212b

200c

206d — OBTAIN NETWORK CONFIGURATION

SELECT BROKER CONFIGURATION — 212d

224d — ANALYZE PROCESSED TRAFFIC

OBTAIN AND PROCESS NETWORK TRAFFIC — 218d

230d — DOES ANALYSIS INDICATE MODIFICATION(S) WARRANTED?

No

Yes

236d — EFFECTUATE MODIFICATION(S)

200d

300

600

APPARATUSES AND METHODS FOR MANAGING TRAFFIC IN COMMUNICATION NETWORKS AND SYSTEMS IN CONJUNCTION WITH A CONFIGURABLE BROKER

CROSS-REFERENCE TO RELATED APPLICATION

This application claims the benefit of and priority to U.S. Provisional Ser. No. 63/482,411, filed Jan. 31, 2023. All sections of the aforementioned application are incorporated herein by reference in their entirety.

FIELD OF THE DISCLOSURE

The subject disclosure is directed to apparatuses and methods for managing traffic in communication networks and systems in conjunction with a configurable broker.

BACKGROUND

As the world increasingly becomes connected via vast communication networks and systems, additional opportunities are created/generated to provision communication services to users (e.g., subscribers). The provisioning of communication services is frequently accompanied by a host of technical and economic challenges. For example, networks operators and service providers may attempt to increase (e.g., maximize) an efficiency of operations, which entails ensuring a certain quality of service (QoS) or quality of experience (QoE) for users/subscribers while reducing (e.g., minimizing) an amount of resources that are needed to achieve that QoS or QoE.

In an effort to meet various performance metrics or thresholds, and in order to identify potential issues or problems that may arise from time to time, a communication network or system may include probes that may be used to collect and monitor parameters/properties of network or system traffic. However, existing options to facilitate such monitoring (or associated analyses) are expensive to operate at scale and frequently include vendor-specific topologies/ configurations that are difficult to migrate from one version of a network or system to another version of the network or system. Given the scarcity of computing resources that are available in most networks or systems, allocating monitoring or analytical functions to compute hosts within the network/system would be ill-advised, as doing so would deprive the compute hosts of resources needed to actually provide or facilitate the communication services.

BRIEF DESCRIPTION OF THE DRAWINGS

Reference will now be made to the accompanying drawings, which are not necessarily drawn to scale, and wherein:

FIGS. 2A-2B are block diagrams illustrating example, non-limiting embodiments of systems in accordance with various aspects described herein.

DETAILED DESCRIPTION

The subject disclosure describes, among other things, illustrative embodiments for managing, processing, and monitoring network or system traffic in accordance with a reconfigurable broker. Other embodiments are described in the subject disclosure.

One or more aspects of the subject disclosure include, in whole or in part, obtaining a configuration of a network; selecting a first configuration of a network packet broker based on the configuration of the network; providing first network traffic to the network packet broker for processing in accordance with the first configuration of the network packet broker; obtaining, based on the providing of the first network traffic to the network packet broker, first processed network traffic; and analyzing the first processed network traffic to determine whether a first modification in the network is warranted.

One or more aspects of the subject disclosure include, in whole or in part, obtaining a configuration file for processing network packets; obtaining a first plurality of packets generated by a first host, the first host comprising at least a first virtual network function (VNF); obtaining a second plurality of packets generated by a second host, the second host comprising at least a second VNF that is different from the first VNF; processing the first plurality of packets and the second plurality of packets in accordance with the configuration file to generate a processed plurality of packets; providing a first portion of the processed plurality of packets to a first probe for analysis; and providing a second portion of the processed plurality of packets to a second probe for analysis, wherein the second portion is at least partially different from the first portion.

One or more aspects of the subject disclosure include, in whole or in part, providing, by a processing system including a processor, first network traffic to a network packet broker; obtaining, by the processing system and based on the providing of the first network traffic to the network packet broker, first processed network traffic generated by the network packet broker in accordance with a first configuration of a first portion of the network packet broker; analyzing, by the processing system, the first processed network traffic, resulting in a first analysis; determining, by the processing system and based on the first analysis, that a modification to processing performed by the network packet broker is warranted; and causing, by the processing system and based on the determining, a second portion of the network packet broker to be configured in accordance with a second configuration that is different from the first configuration.

Figure 1:
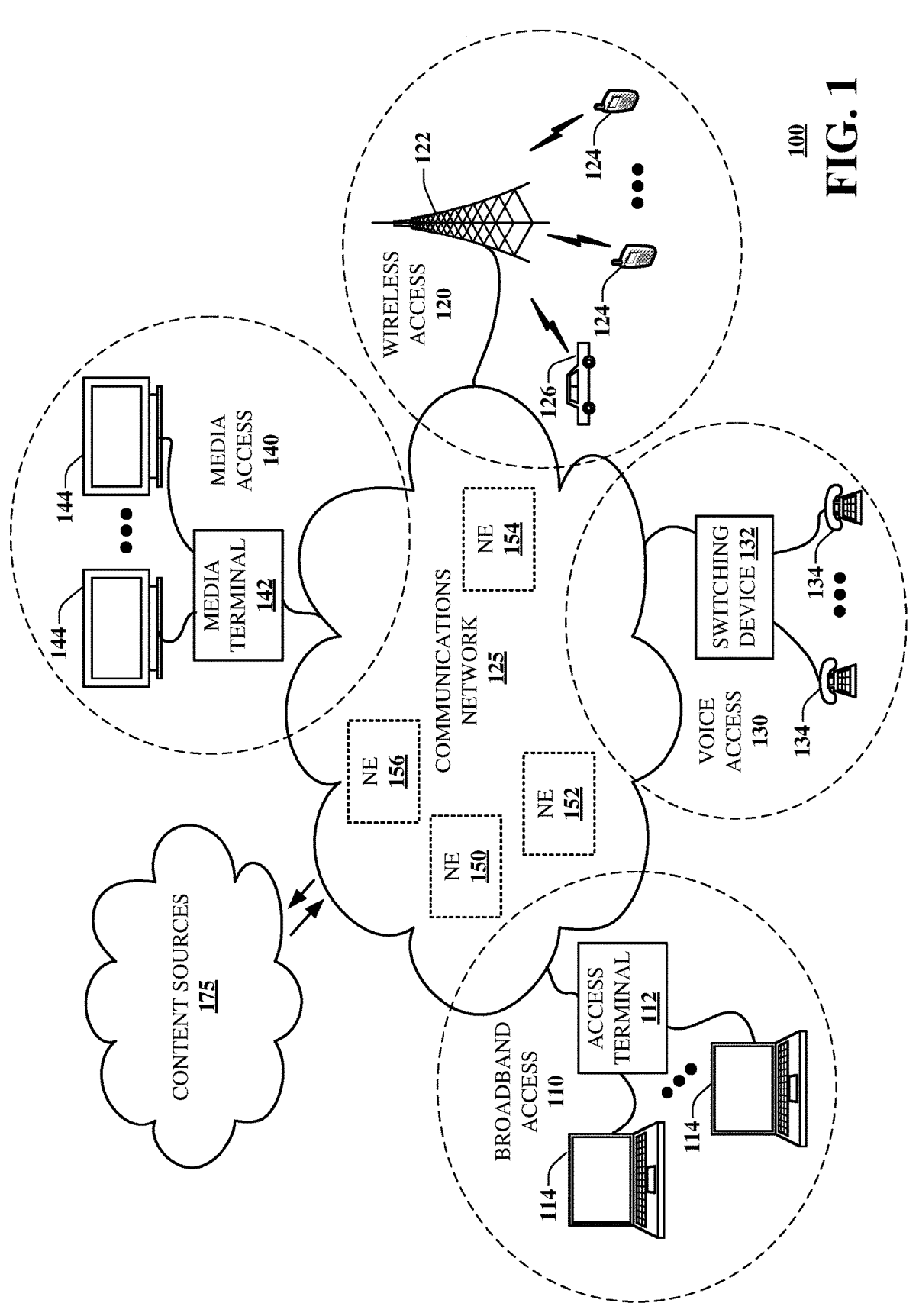
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part obtaining a configuration of a network, selecting a first configuration of a network packet broker based on the configuration of the network, providing first network traffic to the network packet broker for processing in accordance with the first configuration of the network packet broker, obtaining, based on the providing of the first network traffic to the network packet broker, first processed network traffic, and analyzing the first processed network traffic to determine whether a first modification in the network is warranted. The system 100 can facilitate in whole or in part obtaining a configuration file for processing network packets, obtaining a first plurality of packets generated by a first host, the first host comprising at least a first virtual network function (VNF), obtaining a second plurality of packets generated by a second host, the second host comprising at least a second VNF that is different from the first VNF, processing the first plurality of packets and the second plurality of packets in accordance with the configuration file to generate a processed plurality of packets, providing a first portion of the processed plurality of packets to a first probe for analysis, and providing a second portion of the processed plurality of packets to a second probe for analysis, wherein the second portion is at least partially different from the first portion. The system 100 can facilitate in whole or in part providing, by a processing system including a processor, first network traffic to a network packet broker, obtaining, by the processing system and based on the providing of the first network traffic to the network packet broker, first processed network traffic generated by the network packet broker in accordance with a first configuration of a first portion of the network packet broker, analyzing, by the processing system, the first processed network traffic, resulting in a first analysis, determining, by the processing system and based on the first analysis, that a modification to processing performed by the network packet broker is warranted, and causing, by the processing system and based on the determining, a second portion of the network packet broker to be configured in accordance with a second configuration that is different from the first configuration.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
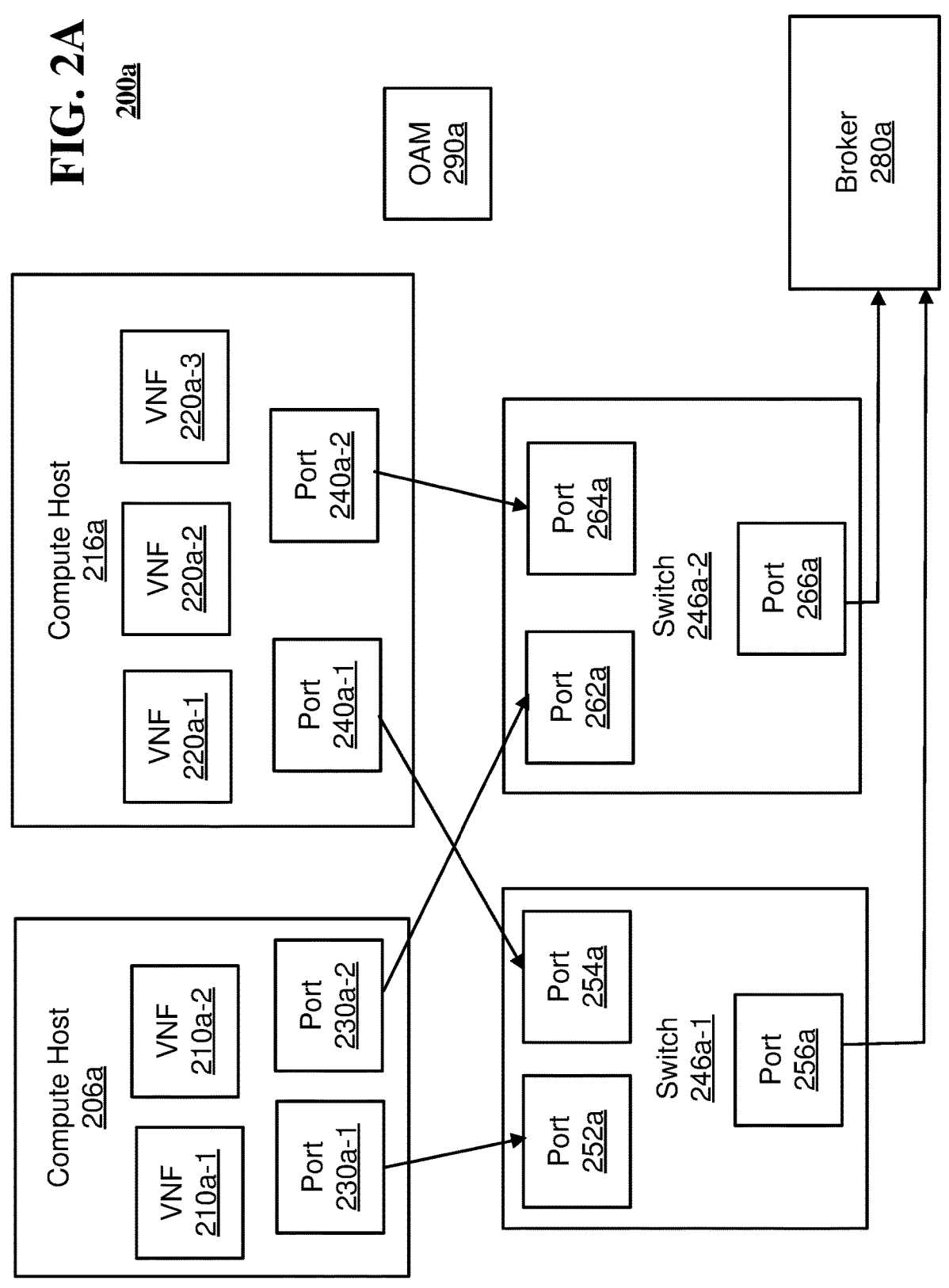

FIG. 2A is a block diagram illustrating an example, non-limiting embodiment of a system 200a in accordance with various aspects described herein. In some embodiments, the system 200a (or a portion thereof) may function within, or may operatively overlaid upon, one or more portions of the system 100 of FIG. 1. The system 200a may be configured to facilitate one or more communication services, such as for example voice, data, messaging, media distribution, etc. In some embodiments, the system 200a may be used to support mobility services for one or more users or subscribers to a communication service or network. The system 200a may support operations associated with one or more radio access networks (RANs) and/or one or more radio access technologies (RATs), such as for example 3G, 4G, LTE, 5G, and so on.

The system 200a may include one or more compute hosts, such as for example a first compute host 206a and a second compute host 216a. Each of the compute hosts may be associated with, or tasked with, providing functionality as part of a communication network or system. In this respect, each of the compute hosts 206a and 216a are shown as including one or more virtual network functions (VNFs) that may facilitate such functionality. More specifically, the compute host 206a may include a VNF 210a-1 and a VNF 210a-2 and the compute host 216a may include a VNF 220a-1, a VNF 220a-2, and a VNF 220a-3. The number or count of VNFs is illustrative, which is to say that any number of VNFs (up to a practical limit associated with resources that are available) may be included.

The compute hosts 206a and 216a may include ports (or other interfaces) that may be used to interface to other entities, such as switches 246a-1 and 246a-2. In this respect, the compute host 206a may include a port 230a-1 and a port 230a-2 and the compute host 216a may include a port 240a-1 and a port 240a-2. The ports 230a-1, 230a-2, 240a-1, and 240a-2 may interface to respective ones of the ports 252a, 254a, 262a, and 264a of the switches 246a-1 and 246a-2 in the manner shown in FIG. 2A. By virtue of such interfaces, traffic or data that is generated or managed by the compute hosts 206a and 216a may be provided to the switches 246a-1 and 246a-2. The one-to-one relationship between a port of a given compute host and a port of a given switch in FIG. 2A is exemplary, which is to say that other configurations may be used without departing from the scope and spirit of this disclosure. For example, a given port (e.g., port 230a-1) of a given compute host (e.g., compute host 206a) may be interfaced to/with multiple ports of one or more switches to, e.g., promote reliability or redundancy in some embodiments.

In addition to the ports that interface to the compute hosts 206a and 216a, the switches 246a-1 and 246a-2 may include other ports (e.g., port 256a and port 266a) that may interface to a broker 280a (where the broker 280a may also be referred to as a network packet broker in the event that the broker 280a is operative in connection with network packets). The traffic or data (or, analogously, packets) conveyed by the ports 256a and 266a to the broker 280a may correspond to an aggregation of the traffic or data obtained at the ports 252a and 254a (in the case of the port 256a) and/or the traffic or data obtained at the portions 262a and 264a (in the case of the port 266a).

The system 200a may include an operations, administration, and management (OAM) entity as denoted by reference character 290a. As the nomenclature implies, the OAM 290a may be responsible for facilitating functionality associated with operations, administration, and/or management, which functionality may be distinguished from the substantive communication services tasks/functionalities facilitated by the compute hosts 206a and 216a. While not explicitly shown in FIG. 2A, the OAM 290a may interface with one or more of the switches 246a-1 and 246a-2 (using one or more dedicated ports of the switches not shown, or using one or more of the ports of the switches shown in FIG. 2A) for purposes of processing or monitoring traffic or data generated or managed by the OAM 290a. In this regard, and for purposes of this disclosure, the OAM 290a may be assumed to be analogous to a compute host, with the understanding that the responsibilities or tasks managed by the OAM 290a may be different from the responsibilities or tasks managed by a typical compute host. Stated differently, the OAM 290a is shown in FIG. 2A for the sake of completeness, with the understanding that other entities not shown in FIG. 2A may be included or incorporated as part of the system 200a in some embodiments. For example, elements/entities of the system 200a (and/or the system 200b described below) may be communicatively included in, or coupled to, a wide area network (WAN). In some embodiments, one or more compute hosts may be included as part of an overall cloud deployment that is interconnected via the WAN. The WAN may enable outside sources of traffic (e.g., mobility network) to have reachability to the application functions executing on the compute hosts.

Referring now to FIG. 2B, a system 200b is shown. While depicted separately, in some embodiments one or more portions of the system 200b may be combined with one or more portions of the system 200a of FIG. 2A. Stated differently, aspects of the system 200a and aspects of the system 200b may be included or incorporated as part of a communication network or system in some embodiments.

The system 200b may include a broker 280b. In some embodiments, the broker 280b may correspond to the broker 280a of FIG. 2A. More specifically, the broker 280b may correspond to a portion (e.g., one-half) of a broker and the broker 280a may correspond to another portion (e.g., the other half) of the broker. In this respect, the broker 280b may be responsible for generating outputs of the broker (whereas the broker 280a may be responsible for obtaining inputs to the broker). The broker may process the inputs to generate the outputs as described in further detail below in relation to the system 200c of FIG. 2C.

With reference to FIG. 2B, one or more outputs of the broker (which may include processed traffic or data) may be provided to ports 256b and 266b of switches 246b-1 and 246b-2, respectively. The traffic or data obtained at the port 256b may be disassembled/disaggregated and routed/provided to ports 252b and 254b. Similarly, the traffic or data obtained at the port 266b may be disassembled/disaggregated and routed/provided to ports 262b and 264b. The ports 252b and 254b may be interfaced to/with ports 230b-1 and 240b-1 of compute hosts 206b and 216b, respectively, as shown in FIG. 2B. Similarly, the ports 262b and 264b may be interfaced to/with ports 230b-2 and 240b-2 of the compute hosts 206b and 216b, respectively.

The compute hosts 206b and 216b may be referred to as probe hosts herein, as they may each host a set of one or more probes (e.g., probes 202b and 212b). The probes 202b/212b may be operative upon traffic or data obtained by the respective compute hosts 206b/216b. For example, the probes 202b/212b may process and analyze the traffic or data to identify patterns, anomalies, errors, qualities, characteristics, etc., in the traffic or data. Based on the analysis provided by the probes 202b/212b, one or more actions (e.g., one or more corrective actions) may be invoked or initiated.

Figure 2C:
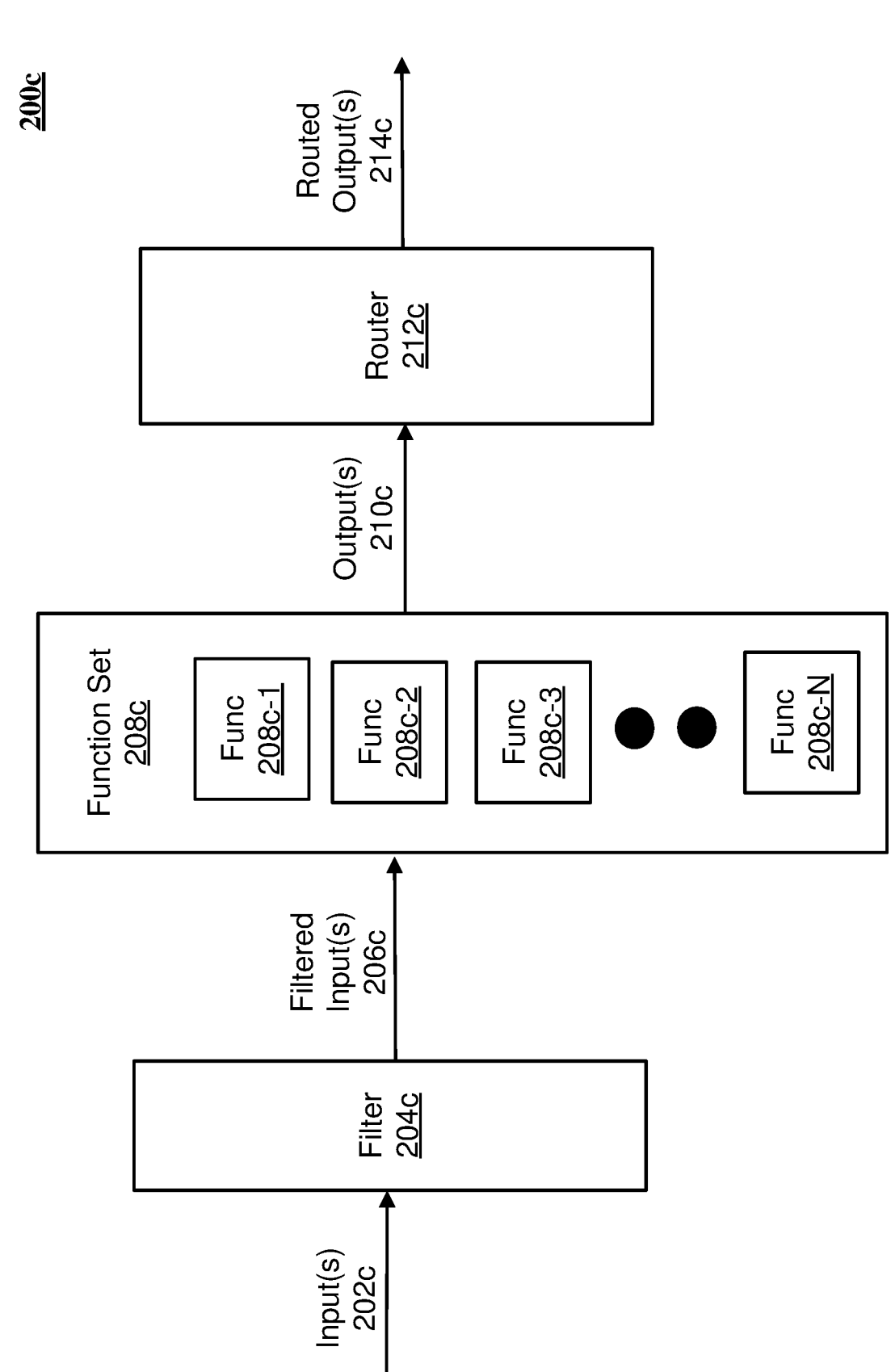
FIG. 2C illustrates a system that may be implemented as a broker (e.g., a network packet broker) in accordance with various aspects of this disclosure.

Pivoting to FIG. 2C, the system 200c referred to above is shown. One or more aspects or portions of the system 200c may be included or incorporated as part of one or more brokers, such as the broker 280a of FIG. 2A and/or the broker 280b of FIG. 2B. Aspects or portions of the system 200c may be included or incorporated as part of one or more processing systems.

The system may include a filter (or, analogously, a filtering function) 204c. The filter 204c may obtain/receive one or more inputs 202c, such as data, traffic, packets, or the like. For example, and briefly referring to FIG. 2A (and FIG. 2C), the inputs to the filter 204c may correspond to the outputs of the switches 246a-1 and 246a-2 (e.g., the outputs of the ports 256a and 266a, respectively).

The filter 204c may process the inputs 202c by removing/discarding at least some of the traffic, data, packets, etc., included in the inputs 202c to generate filtered input(s) 206c. The amount or extent of filtration (e.g., traffic/data/packet removal) provided by the filter 204c may be a function of an application or service that is supported by the system 200c. For example, it may be the case that a first application or service requires X % of the input(s) 202c to be included in the filtered input(s) 206c, and a second application or service may require Y % of the input(s) 202c to be included in the filtered input(s) 206c, where X and Y are numbers and where X and Y may be a same number or different numbers. Other parameters may be taken into consideration beyond merely percentages of the input(s) 202c as part of the operations of the filter 204c. For example, the filter 204c may operate upon the inputs 202c based on: a type or kind of traffic, header information included in the traffic, identifications of a port, compute host, or switch where the traffic originated, identifications of a port, compute host, or switch where the traffic is destined, user-defined or machine-based lists, etc.

The filtered input(s) 206c may be provided to a set of one or more functions 208c. For example, the function set 208c may include a first function 208c-1, a second function 208c-2, a third function 208c-3, . . . , and/or an $N^{th}$ function 208c-N, where N is a number. The functions included in the function set 208c may be of any type or kind of function now known or later developed. By way of example, and without limitation, the functions of the function set 208c may include one or more of: truncation, sampling, error correction, replication, encryption/decryption, modulation/demodulation, amplification, frequency-shifting, time-shifting, etc. The functions of the function set 208c may be employed/utilized in any combination, e.g., serially/sequentially, in parallel, etc. The function set 208c may operate upon the filtered input(s) 206c to generate one or more output(s) 210c. In turn, the output(s) 210c may be processed or managed by a router 212c to generate routed output(s) 214c. Referring briefly to FIG. 2B (and FIG. 2C) the routed output(s) 214c may be provided to inputs of the switches 246b-1 and 246b-2 (e.g., the inputs of the ports 256b and 266b, respectively), and ultimately, the probes 202b and/or the probes 212b by virtue of the arrangement shown in FIG. 2B. In some embodiments, the router 212c may implement a load balancing function to distribute a load represented by the output(s) 210c amongst the switches 246b-1 and 246b-2, the compute hosts 206b and 216b, and/or the probes 202b and 212b.

Aspects of the system 200c (potentially inclusive of the function set 208c and/or the router 212c) may support steering. Steering may dictate where the filtered input(s)/traffic 206c (or processed versions thereof) are sent to, and may be expressed in terms of one or more ports (of a broker) that the filtered input(s)/traffic 206c should be sent to. In some embodiments, endpoint groups may be defined, where individual probe endpoints may be defined using target addresses (e.g., target IP addresses) within one or more of the groups. Filtered traffic may be load-balanced across endpoints within a group. In some instances, the filtered traffic may be replicated such that the same traffic gets sent to one or more groups or ports.

In some embodiments, various or multiple instances of the system 200c (or one or more portions of an instance of the system 200c) may be utilized to achieve a dynamic reconfiguration of a broker function "on the fly". For example, at a first instance in time it may be the case that the inputs 202c should be processed in accordance with a first configuration of the function set 208c. Thereafter, at a second instance in time it may be the case that the inputs 202c should be processed in accordance with a second configuration of the function set 208c, where the second configuration of the function set 208c may be different from the first configuration of the function set 208c. In the period of time from when a determination is made that the second configuration should be used until the second configuration is available for use (which may be on the order of microseconds, milliseconds, seconds, etc., depending on the complexity of the particular function set 208c that is used), the first configuration may continue to support processing/handling of the input(s) 202c. Once the second configuration is available for use, the first configuration may be disbanded/disabled to free-up resources associated with the system 200c. In this manner, flexibility may be obtained without any loss of quality or accuracy in terms of the processing of the inputs 202c.

The configuration (or reconfiguration) of the system 200c (or, analogously, a portion thereof) may be a function of requirements or specifications that may be established or managed by one or more entities. For example, a compute host or probe (such as a compute host or probe shown in FIG. 2B) may determine that a different type, kind, or amount of processing should be effectuated by the system 200c in order for the compute host or probe to successfully discharge the tasks or functions that may be performed by, or delegated to, the compute host or probe. In some embodiments, an operator may determine that a different type of traffic needs to be filtered and perform a dynamic filter criteria update to cause the change to take effect.

Figure 2D:
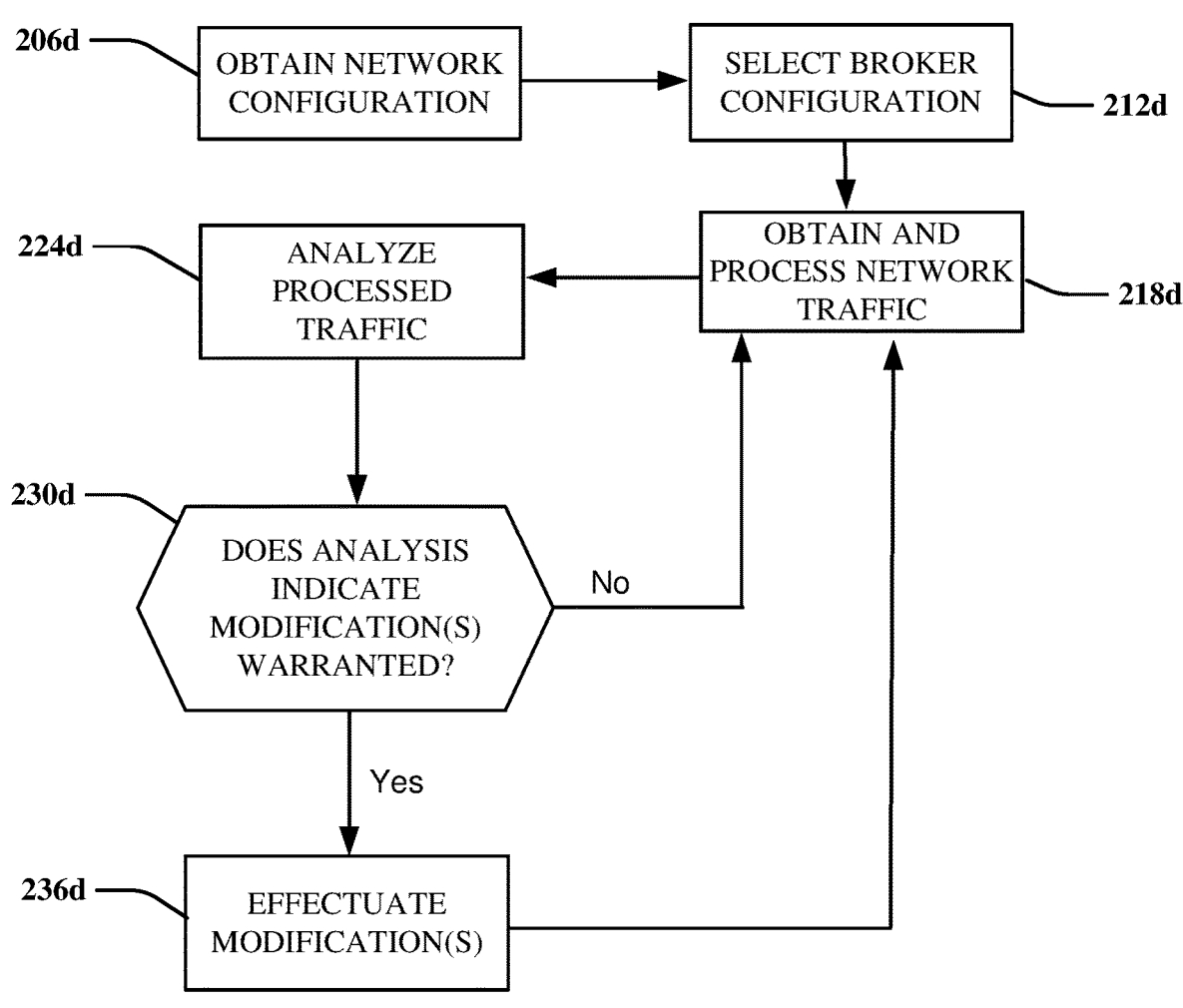
FIG. 2D depicts an illustrative embodiment of a method in accordance with various aspects described herein.

Referring now to FIG. 2D depicts an illustrative embodiment of a method 200d in accordance with various aspects described herein is shown. The method 200d may be implemented (e.g., executed), in whole or in part, in conjunction with one or more systems, devices, and/or components, such as for example the systems, devices, and components set forth herein. The method 200d may be implemented via one or more processing systems, where each processing system may include one or more processors. The method 200d may be included as part of a closed-loop system or algorithm to facilitate a monitoring of network loads or traffic, with adaptations potentially being made to respond to changes in conditions, events, or the like.

In block 206d, a configuration of a network (or, analogously, system) may be obtained. For example, and briefly referring to FIGS. 2A-2B, a type, kind, or count of compute hosts (206a, 216a, 206b, 206b) and switches (246a-1, 246a-2, 246b-1, 246b-2) may be determined or identified. Block 206d may include an identification of network resources that are available, an identification of communication sessions that are supported by the network, an identification of users or user equipment/client devices that are supported by the network, etc.

In block 212d, a configuration of a broker (see, e.g., broker 280a and broker 280b of FIG. 2A and FIG. 2B) may be determined/identified/selected. For example, the configuration of the broker may be determined/identified/selected based on the configuration of the network obtained/identified as part of block 206d. As part of block 212d, the broker may be configured in accordance with the selection.

In block 218d, network load/traffic may be obtained and processed. For example, the processing of block 218d may be facilitated by the broker referred to above as part of block 212d. The processing of block 218d may be based on the configuration of the broker as obtained in block 212d. The block 218d may include forwarding or routing the processed load/traffic to one or more probes (potentially by way of one or more switches, compute hosts, or the like) for analysis.

In block 224d, the processed load/traffic of block 218d may be analyzed. The analysis of block 224d may be performed to identify any number or kind of parameters pertaining to performance, network health, or the like. For example, the analysis of block 224*d* may pertain to QoS or QoE, efficiency, security, billing, etc.

In block 230*d*, and based on the analysis of block 224*d*, a determination may be made whether any modifications are warranted. For example, as part of block 230*d*, a determination may be made whether the amount or type of data processed or analyzed (via the blocks 218*d* and 224*d*) is deficient in any respect, such that a reconfiguration of the broker may be warranted. As another example, it may be the case that due to user equipment (UE) mobility, a QoS or QoE experienced by the UE becomes substandard (e.g., is less than a threshold), such that it may be desirable for a communication session engaged in by the UE to be transferred from a first resource (e.g., a first base station) to a second resource (e.g., a second base station) to enhance the QoS or QoE.

In block 236*d*, one or modifications identified as part of block 230*d* may be effectuated. Block 236*d* may include, without limitation, causing a reconfiguration of the broker, causing a modification of a communication parameter (e.g., a transmission power level, a receiver sensitivity level, a frequency or frequency band that is used, an encryption/decryption scheme that is used, a modulation/demodulation scheme that is used, etc.) associated with one or more devices, causing an adaptation of a parameter of an application or a service, etc. From block 236*d*, flow may proceed to block 218*d* in order to obtain and process network traffic/load in accordance with the modifications/changes made as part of block 236*d*.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of this disclosure may facilitate a network packet broker design/implementation that builds on underlying capabilities of commercially available packet processing devices to provide enhanced packet brokering capabilities. The use and implementation of a packet brokering capability may enable a network operator to supply network traffic to consuming applications or endpoints, such as probing applications, probing devices, and analytics applications. Aspects of a broker may be integrated into network infrastructure of a network or cloud operator, where such infrastructure may host mobility and/or core functions/functionality. In some embodiments, network traffic that flows through the network infrastructure may be ingested into a network packet broker, where it may be processed according to a unique packet broker configuration that is selectively tunable to detect a specific set of mobility core traffic flows, filter on specific matching criteria, apply additional packet processing as needed, and steer the output traffic to a target set of endpoints (i.e., probing applications, probe devices, analytics applications).

A network packet broker configuration framework of this disclosure may be parameter-driven to enable specific local traffic values (e.g., VLAN IDs) that identify each type of traffic flow to be set as needed through a packet broker configuration process. Detected categories of traffic may be further discriminated through the application of specific local filter criteria, which may include header parameters of an IPv4 or IPv6 packet (such as, IPv4 addresses, IPv6 addresses, Layer-4 ports, packet TTL, any inner headers such as GTP-tunnel-ID, IP address, etc.) associated with each type of traffic flow. This type of detailed specific filter criteria may be applied dynamically without a need to interrupt or take out-of-service a broker. This parameter-driven configuration model enables operations to be performed and managed via a wide-scale deployment of packet brokering capabilities across a large geographic footprint of network infrastructure that supports traffic (e.g., mobility based traffic). The ability to apply detailed filter criteria to each of a plurality of network packet broker instances (or portions thereof) in a dynamic manner allows operations to be coarsely or finely adjusted and tuned. Further, aspects of this disclosure enable a broker to collect and steer to consuming applications traffic that is desired at any given point of time, without interruption to service functions operating in network infrastructure, and without interruption to the packet brokering that is supplying traffic to the various consuming entities or applications.

Network resources may include a set of compute hosts that may be integrated with, or coupled to, a set of network switching fabric resources, or switches for short. A switch, may provide layer-2 switching of traffic to and from the compute hosts, where network functions may be hosted. An embodiment may connect a network packet broker to a set of ports on one or more layer-2 switches. The compute hosts in the network infrastructure may also be connected to a set of ports on the switches. At least some (e.g., all) of the traffic that is sent or received by the network functions hosted on the compute hosts may pass through the switches. The switches may be configured to mirror traffic from the ports facing towards the compute hosts, to the ports facing towards the network packet broker. This provides the network packet broker with an input feed of the traffic flowing in and out of the network infrastructure. The network packet broker may ingest the mirrored copy of the traffic and begin processing it according to the network infrastructure design/configuration. Upon ingestion of mirrored traffic, the network packet broker may begin processing the traffic to identify the desired traffic type flows and instances within those flows, apply any required packet manipulation or replication (or other functionality), and then steer the desired traffic as output to the various consuming endpoints.

A network packet broker design/configuration of this disclosure may leverage a set of logical constructs (ACLs, ACEs, ingress policies, egress policies, loopback interfaces) and packet processing mechanisms (filtering, filter criteria, steering and endpoint groups) to realize a mobility traffic packet brokering logical design. These mechanisms and constructs may be assembled together to form a packet processing pipeline within a packet broker to identify and manipulate ingested traffic and to send a desired subset of traffic to target, consuming endpoints. A filtering mechanism may be used to discard unwanted traffic before the traffic is sent for further processing on a hardware pipeline of the packet broker. Filtering or processing that is applied may be operative on traffic traversing a network in an upstream direction, a downstream direction, or a combination thereof.

As described herein, filtering may be applied on the input/ingress interfaces of a network packet broker by applying filtering policies on traffic as it enters the network packet broker. Once defined, filtering policies can be applied to multiple ingress interfaces so that the same filtering rules are applied to different ingested streams of traffic. Filter criteria can be expressed in terms of network traffic characteristics, including, for example, IP addresses, VLAN numbers, and application port numbers. Filter criteria can be set by a network operator or service provider to enable the network packet broker to filter out any or all unwanted traffic of a certain type (e.g., Gn traffic), except perhaps for traffic with values that match the specified filter criteria (e.g., filter all Gn traffic except for traffic originating from a certain set of IP addresses). In network deployments such as a 5G User Plane, which typically involve tremendous amounts of traffic for thousands of users, the ability to limit the volume of traffic sent to a consuming probe application may be critical.

Filter criteria that may be utilized may be based on one or more factors or parameters. Examples of types of filtering that may be supported may include one or more of: port-based filtering, IPv4 (or IPv6) based filtering, header-based filtering, GTP Tunnel-ID based filtering, VLAN filtering, user-defined filtering, machine learning or artificial intelligence based filtering, etc.

In some embodiments, filter criteria may be populated into a set of data constructs, which may be loaded into a network packet broker memory where they are applied to ingested streams of traffic. Any traffic matching-on the values specified in the filter criteria may be allowed to pass through the network packet broker to be delivered to consuming endpoints. Any traffic not matching-on the values may be dropped/discarded, filter criteria (or an associated file) may include a container of packet header values, which identify traffic that should be filtered through/passed (i.e., not excluded). The filter criteria file can be combined with other files, or logic, to define complex filtering criteria. For example, when filtering should be done based on VLAN+ IPV4 address combination, then a filtering criterion containing VLAN & IPV4 address parameters will allow traffic based on the values defined in the filter criteria file (or a modified version thereof). The mechanism for specifying filter criteria provides an advantage of being agnostic to a configuration file that may be resident on the network packet broker. The network packet broker may maintain the filter criteria on an associated processing chip, memory device, or the like. New or modified filter criteria may be populated into a file that can be located either locally on a hard-drive (or other storage device), or on a remote access device (e.g., a server). When an update needs to be issued, a "refresh" of the filter criteria can be issued which may cause the network packet broker to fetch the new entries in a filter criteria file from the local storage and/or the remote location and then commit them into the hardware of the network packet broker.

Dynamic changes in a network packet broker may be obtained via the use of the filter criteria. Such changes may be realized in real-time (or in near-real-time), without interrupting the execution of the network packet broker. This dynamic update capability provides the network operator or service provider with an invaluable capability to adjust which traffic is collected by endpoints (e.g., probes, monitors, or the like) as circumstances change to serve the needs of provisioning communication services. In addition, this dynamic capability allows for the creation of sophisticated vertical applications that can generate filter criteria values and trigger updates to the network packet broker filtering or processing mechanisms.

An end or terminal of a packet processing pipeline may include a steering of filtered or processed traffic to target endpoints. For various services, a set of probe applications may be defined as end-point targets to which a network packet broker steers filtered or processed traffic. The probe applications may perform additional functions in support of service operations. As part of the steering, the network packet broker can optionally perform some additional functions, including truncation, replication, and load-balancing. Based on specific defined criterion, and certain flows of traffic, traffic can be truncated, then replicated and then load-balanced, and then forwarded to one or more endpoints included in a set of endpoints.

In some embodiments, traffic that makes it through to the steering phase can be designated for truncation to reduce the size of the packets that are ultimately sent to the destination endpoints by cutting off extraneous data in the packets that is not of interest to the probing application. Reduction of the packet size benefits the consuming probe applications by reducing (e.g., eliminating) unnecessary input/output volume, thereby enabling a probe application to handle additional traffic. Traffic that makes it through to the steering phase can be designated for replication such that different endpoints receive a copy of the same traffic. Using this mechanism, the network packet broker can forward replicas of the same traffic to different consumers or endpoints that may need to process the same traffic.

Load balancing may be applied to traffic when there are multiple consuming endpoints (e.g., a cluster of endpoints). A load balancing mechanism may distribute traffic in an even manner across the set of receiving endpoints; other variations may use a weighted distribution amongst the receiving endpoints. A network packet broker may detect the endpoints and may adjust the load balancing to halt and resume the delivery of traffic to endpoints as they transition from available to unavailable and back to available.

In some embodiments, a network packet broker design/ configuration may include a construct called an endpoint group that may act as a container for a set of destination endpoints to which the network packet broker will forward traffic. An endpoint group may define the way that endpoints should be grouped. In some embodiments, a network packet broker design/configuration may support multiple endpoint groups, and steering criteria may be used to identify which traffic flow/stream fitting the criteria is forwarded to each group. The endpoints in an endpoint group may be defined using one or more identifiers, such as IP addresses (e.g., the IP addresses of each of the receiving probe applications). Each endpoint may be defined to participate in multiple endpoint groups, providing flexibility to use the same endpoint for multiple purposes, assuming that the endpoint is capable of handling multiple types of traffic or a given amount/volume of traffic.

Aspects of this disclosure provide a low-cost network packet brokering solution, suited for wide-scale deployment in, e.g., a mobility service network. Suitability for wide-scaler deployment in a mobility service network means that the packet brokering capabilities, including but not limited to: traffic ingesting, filtering, manipulation, replication, steering and load balancing, need to be executed within a network device that is integrated into the network operator's network infrastructure or fabric, without reliance on complex software applications running on compute hosts, as the network operator's focus and responsibility is the network and the elements that make up the network. As one of skill in the art will appreciate, reliance on software applications running on compute hosts for such tasks/functionality introduces additional costs, reliability risk, latency, and operator complexity, and is therefore not a prudent or viable solution. Aspects of this disclosure provide a solution for delivering traffic needed to consuming applications, without incurring the costs or risks of a proprietary, vendor-specific device solution, or the overhead of hosting and managing complex packet brokering applications.

As demonstrated above, the various aspects of this disclosure may be implemented to generate useful, concrete, and tangible results. Features of this disclosure may be tied to specially programmed machines or apparatuses to obtain such results. The features of this disclosure are transformative in nature, as a network or system configuration may be modified or adapted to adhere/conform to the conditions or circumstances that are present at any given moment in time. As one of skill in the art would appreciate, the various aspects of this disclosure may be integrated as part of numerous practical applications and represent substantial improvements relative to conventional technologies in terms of, e.g., a provisioning of communication services. Suffice it to say, the various aspects of this disclosure are not directed to abstract ideas. To the contrary, the various aspects of this disclosure are directed to, and encompass, significantly more than any abstract idea standing alone.

Figure 3:
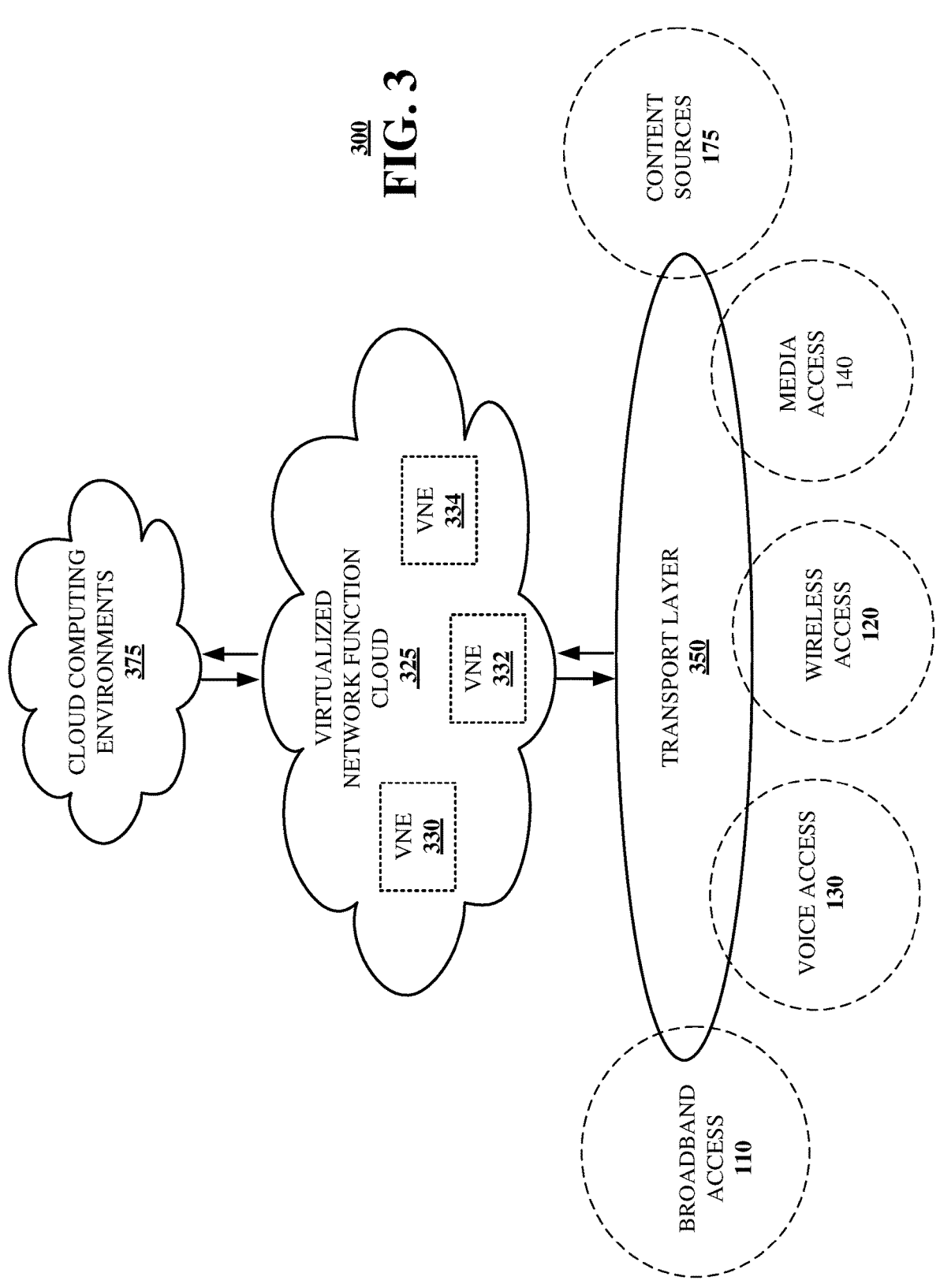
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems 200*a*-200*c*, and method 200*d* presented in FIGS. 1 and 2A-2D. For example, virtualized communication network 300 can facilitate in whole or in part obtaining a configuration of a network, selecting a first configuration of a network packet broker based on the configuration of the network, providing first network traffic to the network packet broker for processing in accordance with the first configuration of the network packet broker, obtaining, based on the providing of the first network traffic to the network packet broker, first processed network traffic, and analyzing the first processed network traffic to determine whether a first modification in the network is warranted. The virtualized communication network 300 can facilitate in whole or in part obtaining a configuration file for processing network packets, obtaining a first plurality of packets generated by a first host, the first host comprising at least a first virtual network function (VNF), obtaining a second plurality of packets generated by a second host, the second host comprising at least a second VNF that is different from the first VNF, processing the first plurality of packets and the second plurality of packets in accordance with the configuration file to generate a processed plurality of packets, providing a first portion of the processed plurality of packets to a first probe for analysis, and providing a second portion of the processed plurality of packets to a second probe for analysis, wherein the second portion is at least partially different from the first portion. The virtualized communication network 300 can facilitate in whole or in part providing, by a processing system including a processor, first network traffic to a network packet broker, obtaining, by the processing system and based on the providing of the first network traffic to the network packet broker, first processed network traffic generated by the network packet broker in accordance with a first configuration of a first portion of the network packet broker, analyzing, by the processing system, the first processed network traffic, resulting in a first analysis, determining, by the processing system and based on the first analysis, that a modification to processing performed by the network packet broker is warranted, and causing, by the processing system and based on the determining, a second portion of the network packet broker to be configured in accordance with a second configuration that is different from the first configuration.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
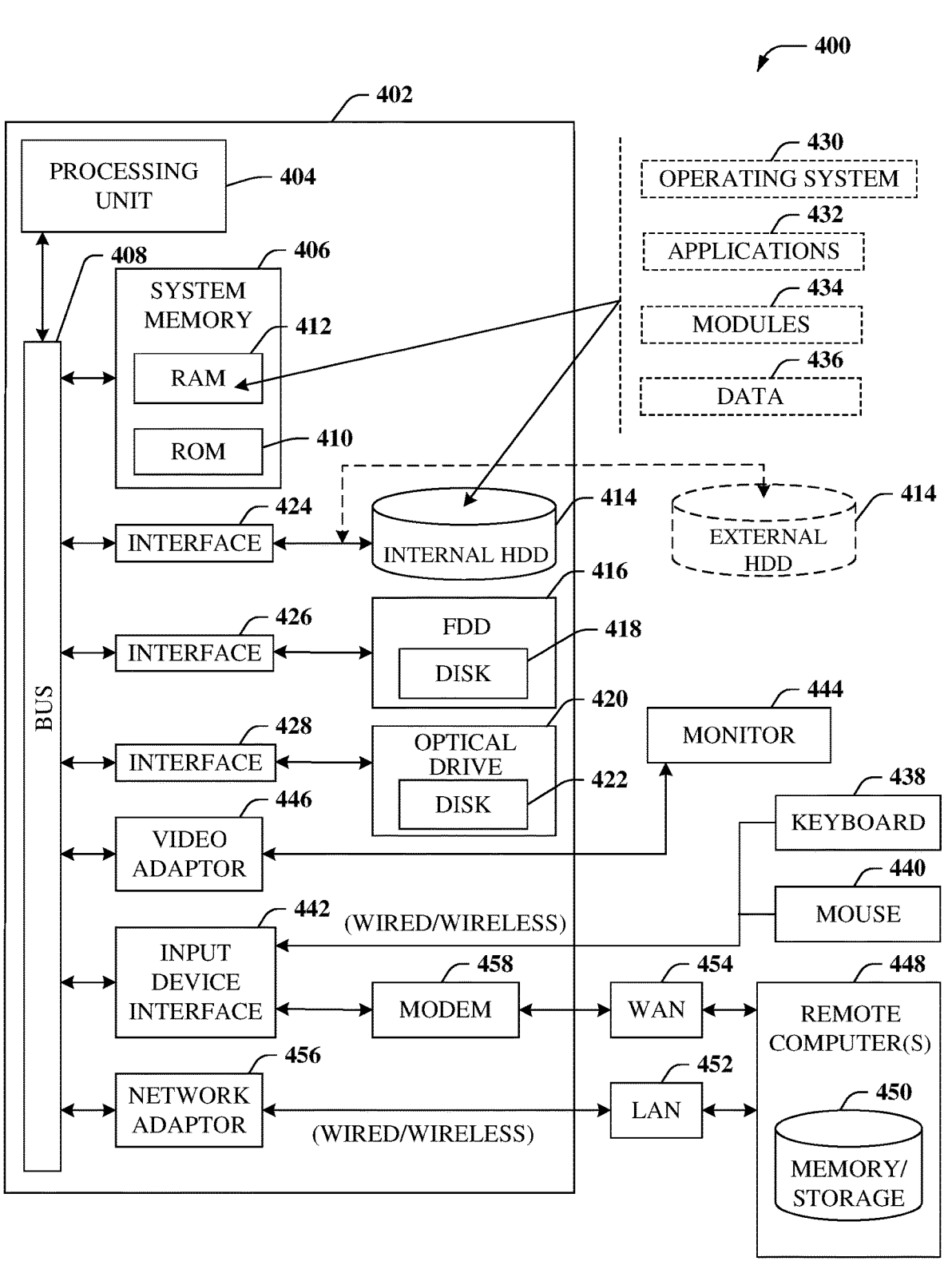
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a configuration of a network, selecting a first configuration of a network packet broker based on the configuration of the network, providing first network traffic to the network packet broker for processing in accordance with the first configuration of the network packet broker, obtaining, based on the providing of the first network traffic to the network packet broker, first processed network traffic, and analyzing the first processed network traffic to determine whether a first modification in the network is warranted. The computing environment 400 can facilitate in whole or in part obtaining a configuration file for processing network packets, obtaining a first plurality of packets generated by a first host, the first host comprising at least a first virtual network function (VNF), obtaining a second plurality of packets generated by a second host, the second host comprising at least a second VNF that is different from the first VNF, processing the first plurality of packets and the second plurality of packets in accordance with the configuration file to generate a processed plurality of packets, providing a first portion of the processed plurality of packets to a first probe for analysis, and providing a second portion of the processed plurality of packets to a second probe for analysis, wherein the second portion is at least partially different from the first portion. The computing environment 400 can facilitate in whole or in part providing, by a processing system including a processor, first network traffic to a network packet broker, obtaining, by the processing system and based on the providing of the first network traffic to the network packet broker, first processed network traffic generated by the network packet broker in accordance with a first configuration of a first portion of the network packet broker, analyzing, by the processing system, the first processed network traffic, resulting in a first analysis, determining, by the processing system and based on the first analysis, that a modification to processing performed by the network packet broker is warranted, and causing, by the processing system and based on the determining, a second portion of the network packet broker to be configured in accordance with a second configuration that is different from the first configuration.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
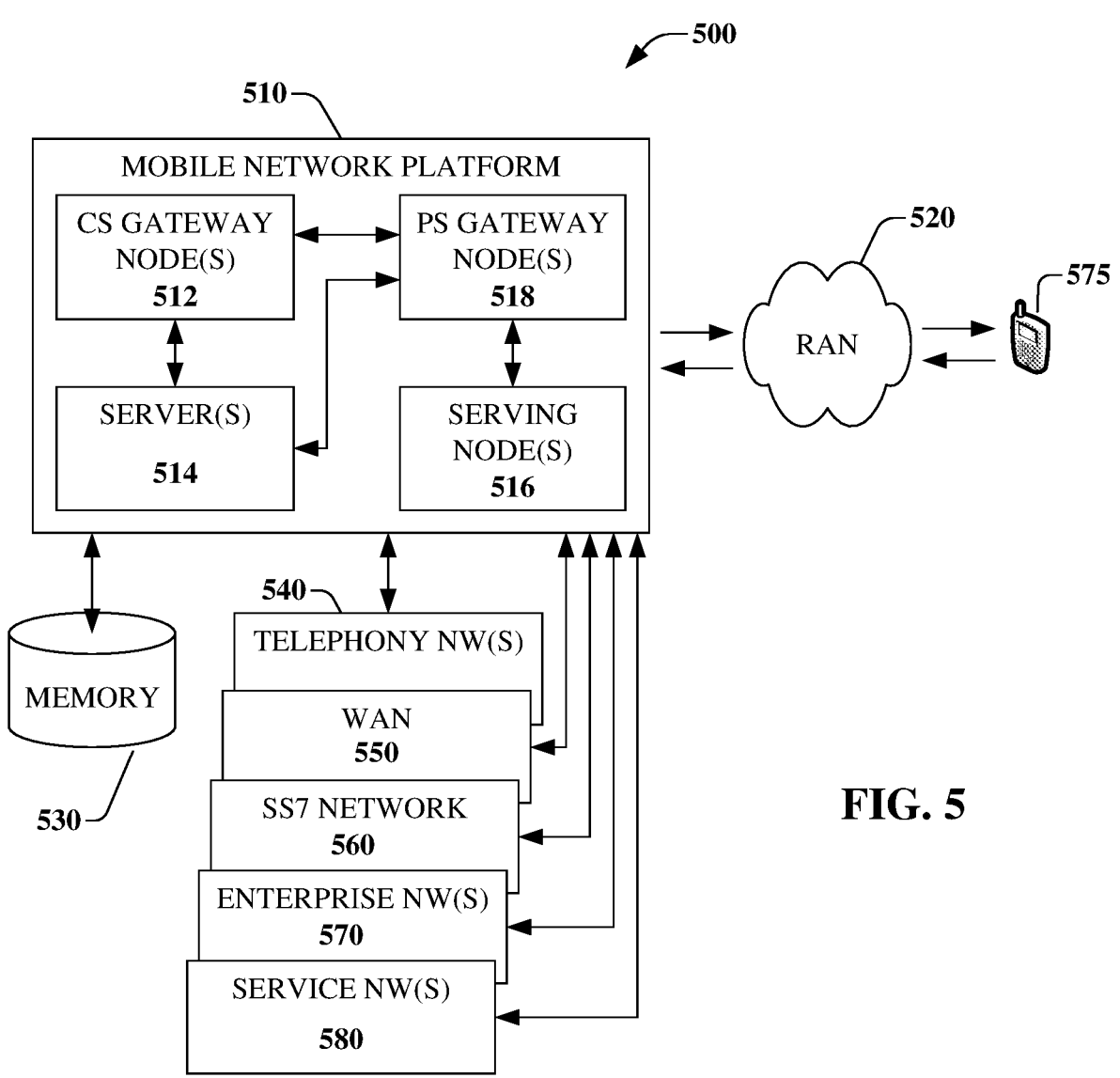
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a configuration of a network, selecting a first configuration of a network packet broker based on the configuration of the network, providing first network traffic to the network packet broker for processing in accordance with the first configuration of the network packet broker, obtaining, based on the providing of the first network traffic to the network packet broker, first processed network traffic, and analyzing the first processed network traffic to determine whether a first modification in the network is warranted. The platform 510 can facilitate in whole or in part obtaining a configuration file for processing network packets, obtaining a first plurality of packets generated by a first host, the first host comprising at least a first virtual network function (VNF), obtaining a second plurality of packets generated by a second host, the second host comprising at least a second VNF that is different from the first VNF, processing the first plurality of packets and the second plurality of packets in accordance with the configuration file to generate a processed plurality of packets, providing a first portion of the processed plurality of packets to a first probe for analysis, and providing a second portion of the processed plurality of packets to a second probe for analysis, wherein the second portion is at least partially different from the first portion. The platform 510 can facilitate in whole or in part providing, by a processing system including a processor, first network traffic to a network packet broker, obtaining, by the processing system and based on the providing of the first network traffic to the network packet broker, first processed network traffic generated by the network packet broker in accordance with a first configuration of a first portion of the network packet broker, analyzing, by the processing system, the first processed network traffic, resulting in a first analysis, determining, by the processing system and based on the first analysis, that a modification to processing performed by the network packet broker is warranted, and causing, by the processing system and based on the determining, a second portion of the network packet broker to be configured in accordance with a second configuration that is different from the first configuration.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
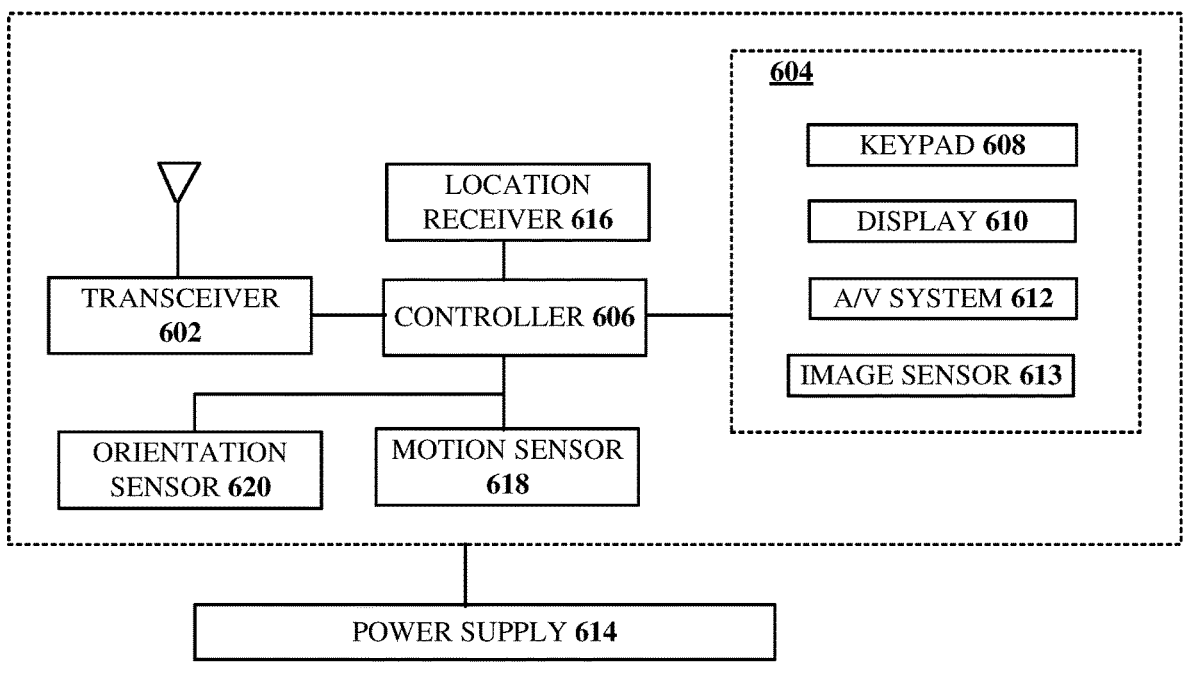
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a configuration of a network, selecting a first configuration of a network packet broker based on the configuration of the network, providing first network traffic to the network packet broker for processing in accordance with the first configuration of the network packet broker, obtaining, based on the providing of the first network traffic to the network packet broker, first processed network traffic, and analyzing the first processed network traffic to determine whether a first modification in the network is warranted. The computing device 600 can facilitate in whole or in part obtaining a configuration file for processing network packets, obtaining a first plurality of packets generated by a first host, the first host comprising at least a first virtual network function (VNF), obtaining a second plurality of packets generated by a second host, the second host comprising at least a second VNF that is different from the first VNF, processing the first plurality of packets and the second plurality of packets in accordance with the configuration file to generate a processed plurality of packets, providing a first portion of the processed plurality of packets to a first probe for analysis, and providing a second portion of the processed plurality of packets to a second probe for analysis, wherein the second portion is at least partially different from the first portion. The computing device 600 can facilitate in whole or in part providing, by a processing system including a processor, first network traffic to a network packet broker, obtaining, by the processing system and based on the providing of the first network traffic to the network packet broker, first processed network traffic generated by the network packet broker in accordance with a first configuration of a first portion of the network packet broker, analyzing, by the processing system, the first processed network traffic, resulting in a first analysis, determining, by the processing system and based on the first analysis, that a modification to processing performed by the network packet broker is warranted, and causing, by the processing system and based on the determining, a second portion of the network packet broker to be configured in accordance with a second configuration that is different from the first configuration.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, perform operations, the operations comprising:
obtaining a configuration of a network;
selecting a first configuration of a network packet broker based on the configuration of the network and first network traffic, wherein the network packet broker comprises a filtering function and a traffic steering function;
providing the first network traffic to the network packet broker for processing in accordance with the first configuration of the network packet broker;
obtaining, based on the providing of the first network traffic to the network packet broker, first processed network traffic;
analyzing the first processed network traffic to determine whether a first modification in the network is warranted, wherein the determination that the first modification is warranted is based at least in part on the first processed network traffic generated by filtering function or the traffic steering function; and
in response to the determination that the first modification is warranted, instructing the network packet broker to continue processing network traffic in accordance with the first configuration during a transition of the network packet broker to a second configuration, and releasing resources associated with the first configuration upon completion of the transition.

2. The device of claim 1, wherein the analyzing comprises a first analysis of a first portion of the first processed network traffic via a first probe, wherein the first analysis comprises analyzing one or more parameters of the first portion pertaining to quality of service (QoS), and a second analysis of a second portion of the first processed network traffic via a second probe, wherein the second analysis comprises analyzing one or more parameters of the second portion pertaining to network health.

3. The device of claim 2, wherein a third portion of the first portion is included in the second portion, the third portion being less than an entirety of the first portion.

4. The device of claim 1, wherein the analyzing indicates that the first modification is not warranted, and wherein the operations further comprise:
providing, subsequent to the analyzing, second network traffic to the network packet broker for processing in accordance with the first configuration of the network packet broker;
obtaining, based on the providing of the second network traffic to the network packet broker, second processed network traffic; and
analyzing the second processed network traffic to determine whether a second modification in the network is warranted.

5. The device of claim 4, wherein the second modification is different from the first modification.

6. The device of claim 1, wherein the analyzing indicates that the first modification is warranted.

7. The device of claim 6, wherein the first modification comprises a selection of a second configuration of the network packet broker, the second configuration being different from the first configuration.

8. The device of claim 7, wherein the operations further comprise:
providing, subsequent to the analyzing, second network traffic to the network packet broker for processing in accordance with the second configuration of the network packet broker;
obtaining, based on the providing of the second network traffic to the network packet broker, second processed network traffic; and
analyzing the second processed network traffic to determine whether a second modification in the network is warranted.

9. The device of claim 6, wherein the first modification comprises a modification of a communication parameter associated with a communication device of the network.

10. The device of claim 9, wherein the communication device includes a user equipment, and wherein the communication parameter pertains to: a transmission power level, a receiver sensitivity level, a frequency or frequency band that is used, an encryption scheme that is used, a decryption scheme that is used, a modulation scheme that is used, a demodulation scheme that is used, or any combination thereof.

11. The device of claim 6, wherein the first modification comprises an adaptation of a parameter of an application or a service.

12. The device of claim 1, wherein the first configuration of the network packet broker results in the network packet broker processing the first network traffic in accordance with at least one function to generate the first processed network traffic.

13. The device of claim 12, wherein the at least one function comprises: truncation, sampling, error correction, replication, encryption, decryption, modulation, demodulation, amplification, frequency-shifting, time-shifting, or any combination thereof.

14. The device of claim 1, wherein the first configuration of the network packet broker results in the network packet broker processing the first network traffic via the filtering function such that an amount of the first processed network traffic is less than an amount of the first network traffic.

15. The device of claim 14, wherein the operations further comprise:
providing a file to the network packet broker, wherein the file comprises criteria for operating the filtering function.

16. The device of claim 1, wherein the providing of the first network traffic to the network packet broker comprises providing the first network traffic to a first port of a first network switch, wherein the first network switch aggregates the first network traffic with second network traffic to generate first aggregated network traffic that is provided to the network packet broker via a second port of the first network switch, wherein the obtaining of the first processed network traffic comprises obtaining the first processed network traffic from a first port of a second network switch that is different from the first network switch.

17. A method, comprising:
providing, by a processing system including a processor, first network traffic to a network packet broker, wherein the network packet broker comprises a filtering function and a traffic steering function based on the first network traffic;
obtaining, by the processing system and based on the providing of the first network traffic to the network packet broker, first processed network traffic generated by the network packet broker in accordance with a first configuration of a first portion of the network packet broker;

analyzing, by the processing system, the first processed network traffic, resulting in a first analysis;

determining, by the processing system and based on the first analysis, that a modification to processing performed by the network packet broker is warranted, wherein the determination that a modification is warranted is based at least in part on the first processed network traffic generated by the filtering function or the traffic steering function;

in response to the determining, instructing, by the processing system, the network packet broker to continue to process network traffic in accordance with the first configuration during a transition of the network packet broker to a second configuration, and releasing resources associated with the first configuration upon completion of the transition; and causing, by the processing system and based on the determining, a second portion of the network packet broker to be configured in accordance with a second configuration that is different from the first configuration.

18. The method of claim 17, further comprising:

providing, by the processing system and subsequent to the causing, second network traffic to the network packet broker during a period of time when the second portion of the network packet broker is being configured;

obtaining, by the processing system and based on the providing of the second network traffic to the network packet broker, second processed network traffic generated by the network packet broker in accordance with the first configuration of the first portion of the network packet broker;

providing, by the processing system and subsequent to the causing, third network traffic to the network packet broker subsequent to the second portion of the network packet broker being configured in accordance with the second configuration; and obtaining, by the processing system and based on the providing of the third network traffic to the network packet broker, third processed network traffic generated by the network packet broker in accordance with the second configuration of the second portion of the network packet broker, wherein the network packet broker releases resources associated with the first configuration upon an expiration of the period of time.

19. A non-transitory machine-readable medium, comprising executable instructions that, when executed by a processing system including a processor, perform operations, the operations comprising:

providing first network traffic to a network packet broker, wherein the network packet broker comprises a filtering function and a traffic steering function based on the first network traffic;

obtaining, based on the providing of the first network traffic to the network packet broker, first processed network traffic generated by the network packet broker in accordance with a first configuration of a first portion of the network packet broker;

analyzing the first processed network traffic, generated by the filtering function and the traffic steering function, resulting in a first analysis;

in response to the analyzing, instructing the network packet broker to continue processing network traffic in accordance with the first configuration during a transition of the network packet broker to a second configuration, and releasing resources associated with the first configuration upon completion of the transition; and causing, based on the first analysis, a second portion of the network packet broker to be configured in accordance with a second configuration.

20. The non-transitory machine-readable medium of claim 19, wherein the second configuration is at least partially different from the first configuration.

* * * * *